United States Patent [19]

Shultz

[11] 4,031,603

[45] June 28, 1977

[54] SNAP-IN CLUTCH SPRING

[76] Inventor: William E. Shultz, 442 W. St. Charles Road, Villa Park, Ill. 60181

[22] Filed: July 1, 1976

[21] Appl. No.: 701,588

[52] U.S. Cl. .................................. 29/427; 29/259; 29/265; 29/278; 29/283

[51] Int. Cl.² ........................................ B23P 19/02

[58] Field of Search ............ 29/427, 426, 235, 244, 29/256, 257, 258, 259, 260, 261, 262, 263, 264, 265, 266, 283, 278, 279, 280

[56] References Cited

UNITED STATES PATENTS

| | | | |
|---|---|---|---|
| 1,451,852 | 4/1923 | Verdoorn | 29/259 X |
| 3,063,140 | 11/1962 | Lydle | 29/261 |
| 3,078,556 | 2/1963 | Carroll | 29/283 X |
| 3,089,229 | 5/1963 | Brodie | 29/261 |
| 3,115,699 | 12/1963 | Nakahira | 29/260 X |
| 3,304,601 | 2/1967 | Torres | 29/261 |
| 3,368,266 | 2/1968 | Shultz | 269/187 X |

*Primary Examiner*—James R. Duzan
*Attorney, Agent, or Firm*—Mason, Kolehmainen, Rathburn & Wyss

[57] ABSTRACT

A clutch spring compressor tool for removing a spring retainer ring from a clutch piston assembly of an automatic transmission where the clutch piston assembly includes a drum housing having an annular slot having a shoulder fabricated on the inner periphery thereof includes resilient arm like members for supporting the tool in working position within the slot of the drum housing having secured thereto a plate that may be inserted into or under the shoulder. In addition, the tool includes a base of a variable dimension that is positioned upon the spring seat of the clutch assembly. The base is secured to a threaded shaft that may be threaded to vary the position of the base relative to the at-rest position of the spring seat in order to compress the spring seat moving it away from the retainer ring and allowing a tool to be employed to remove the ring.

10 Claims, 8 Drawing Figures

Fig. 4
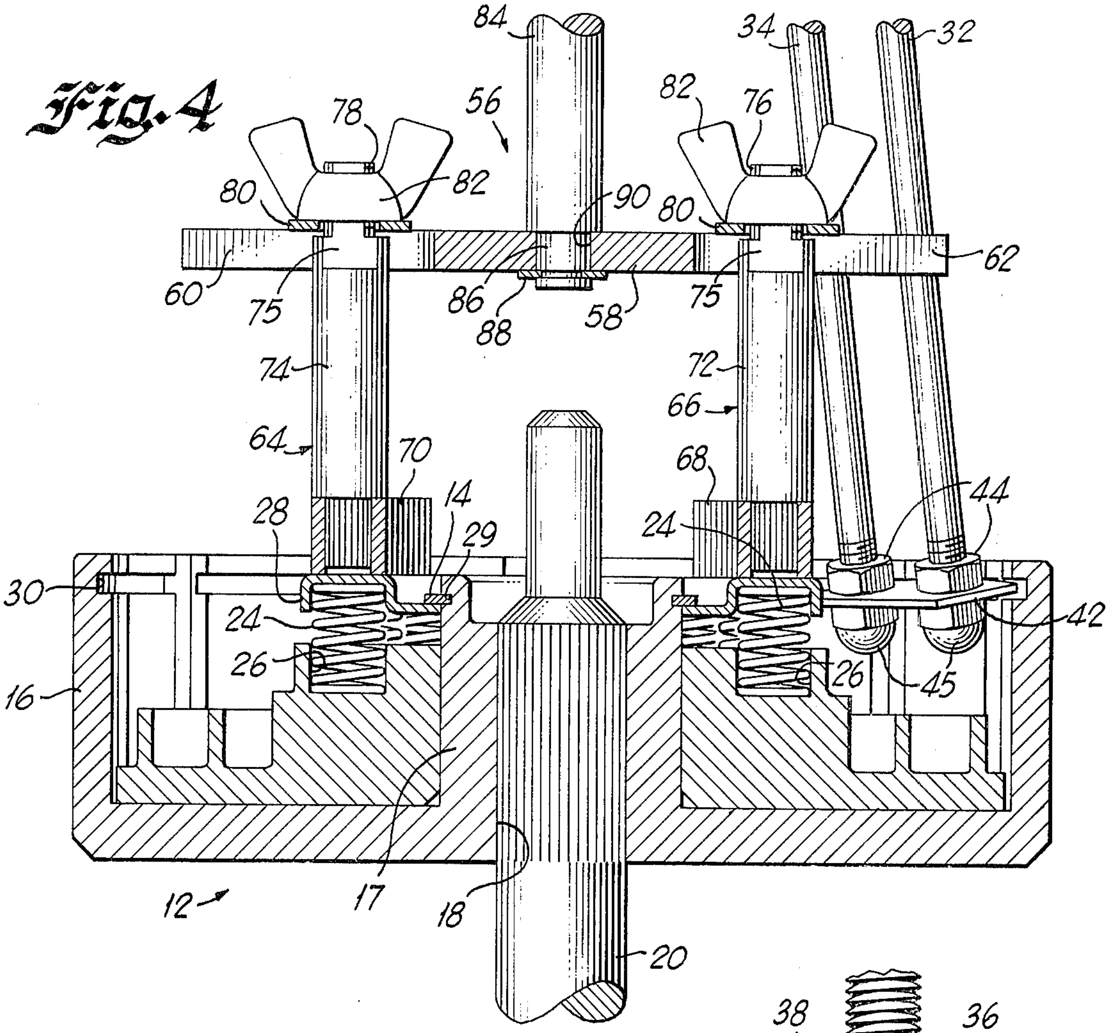
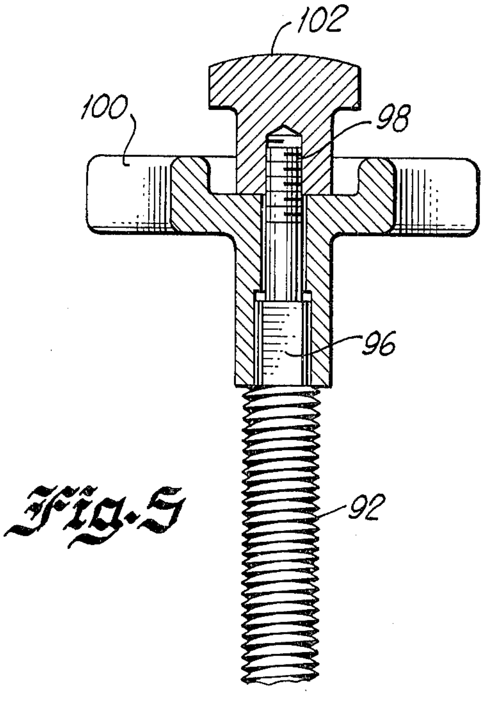
Fig. 5
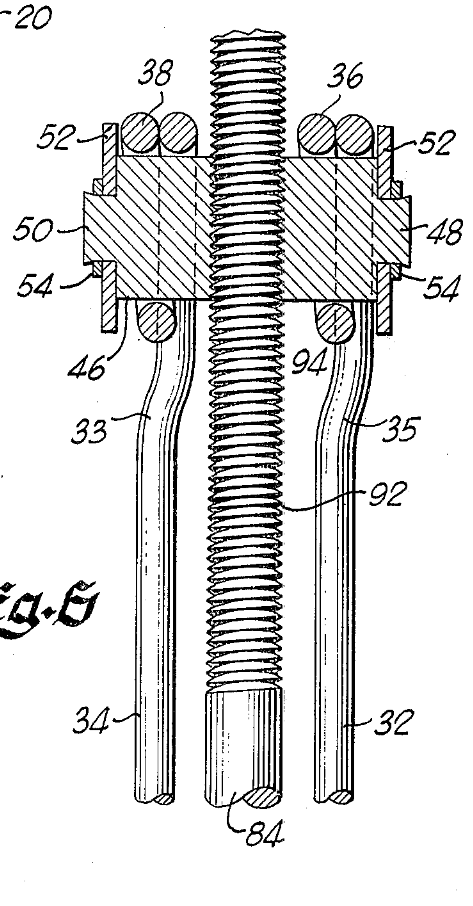
Fig. 6

SNAP-IN CLUTCH SPRING

BACKGROUND OF THE INVENTION 1. Field of the Invention

The present invention relates to a new and improved tool for disassembling a clutch piston assembly of an automobile automatic transmission.

2. Description of the Prior Art

In order to remove a clutch piston from an automobile automatic transmission, several individual tools have been required. A particular problem in removing the clutch piston is the removal of a resilient ring, called a spring retainer ring, which maintains the clutch piston within a piston drum.

Earlier model automatic transmissions include an elongated annular opening in a base or platform portion of the clutch piston assembly. My U.S. Pat. No. 3,368,266 discloses a tool including a threaded stem for inserting into the elongated annular opening in the base of the clutch piston assembly of such earlier model automatic transmissions. The tool is secured into working position by attaching an oversized nut to secure the stem within the annular opening. However, recent engineering changes have resulted in a clutch piston assembly, and, particularly, a drum no longer having a platform or base with an annular opening through which the above-identified prior art tool can be inserted to be secured to the base of the drum. Accordingly, the tool disclosed in my U.S. Pat. No. 3,368,266 is no longer useful in newer automatic transmissions.

All clutch assemblies include an annular slot having a shoulder fabricated on the inner peripheral surface of the piston drum. A retaining ring is positioned within this slot or groove to retain the various portions of the clutch piston assembly within the clutch drum. This retaining ring may be easily removed exposing the slot or shoulder to take advantage of this slot for the purpose of securing the device of the present invention, as described in more detail hereinafter.

SUMMARY OF THE INVENTION

An object of the present invention is to provide a new and improved compressor tool.

Another object of the present invention is to provide a new and improved clutch spring compressor tool for removing clutch pistons in automobile automatic transmissions.

Briefly, the present invention is directed to a new and improved tool for use in disassembling a clutch piston in automobile automatic transmissions. More specifically, the tool is employed to remove the ring retaining the spring seat in the clutch piston assembly and allowing disassembly thereof.

The tool includes one or more resilient arms having attached to the ends thereof a small plate that may be positioned within the drum of the piston assembly and, particularly, within a shoulder or slot fabricated on the inner periphery of the drum. The tool also includes a platform of a variable dimension that may be adjusted to abut and compress the spring seat that is retained within the piston assembly by the retainer ring.

Secured to the platform is a threaded stem that extends through a member coupling the resilient arms that, once the arms are mounted in the drum, is in a stationary position relative to the drum. The threaded stem may be threaded through the coupler thereby varying the position of the platform relative to the at rest position of the spring seat. By applying a compressive force to the platform, the spring(s) retained by the spring seat are compressed away from the retainer ring. Once the spring seat is moved away from the retainer ring, a tool may be employed to remove the retainer ring, thus allowing the piston assembly to be completely disassembled. The reverse procedure may be followed in reassembling the clutch piston assembly.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 4 is a view taken along line 4—4 of FIG. 3;

FIG. 5 is a view taken along line 5—5 of FIG. 2;

FIG. 6 is a view taken along line 6—6 of FIG. 2;

DESCRIPTION OF THE PREFERRED EMBODIMENT

Figure 1:
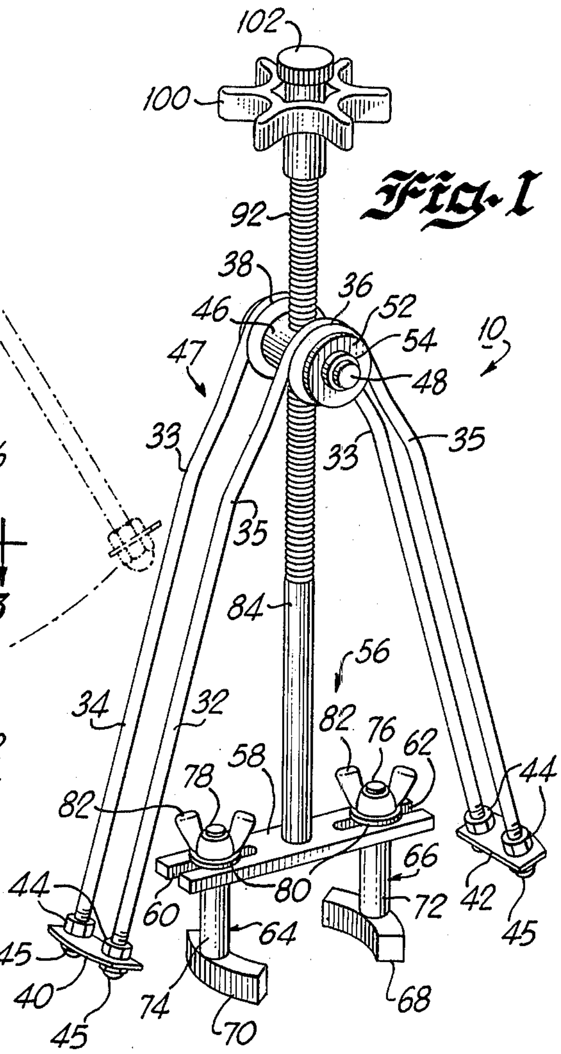
FIG. 1 is an isometric view of a tool constructed in accordance with the principles of the present invention.

With reference to the figures and initially to FIG. 1, there is illustrated a new and improved clutch spring compressor tool generally designated as 10. The clutch spring compressor tool 10 may be employed for removing the clutch piston in all vehicle automatic transmissions.

Figure 3:
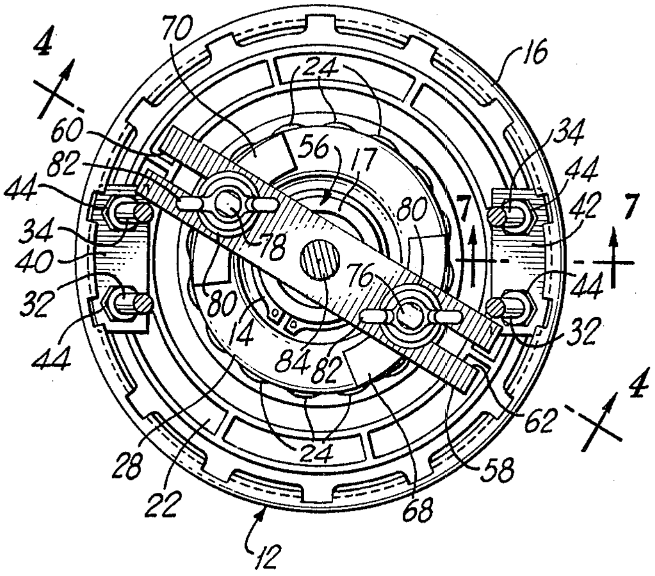
FIG. 3 is a view taken along line 3—3 of FIG. 2.
Figure 2:
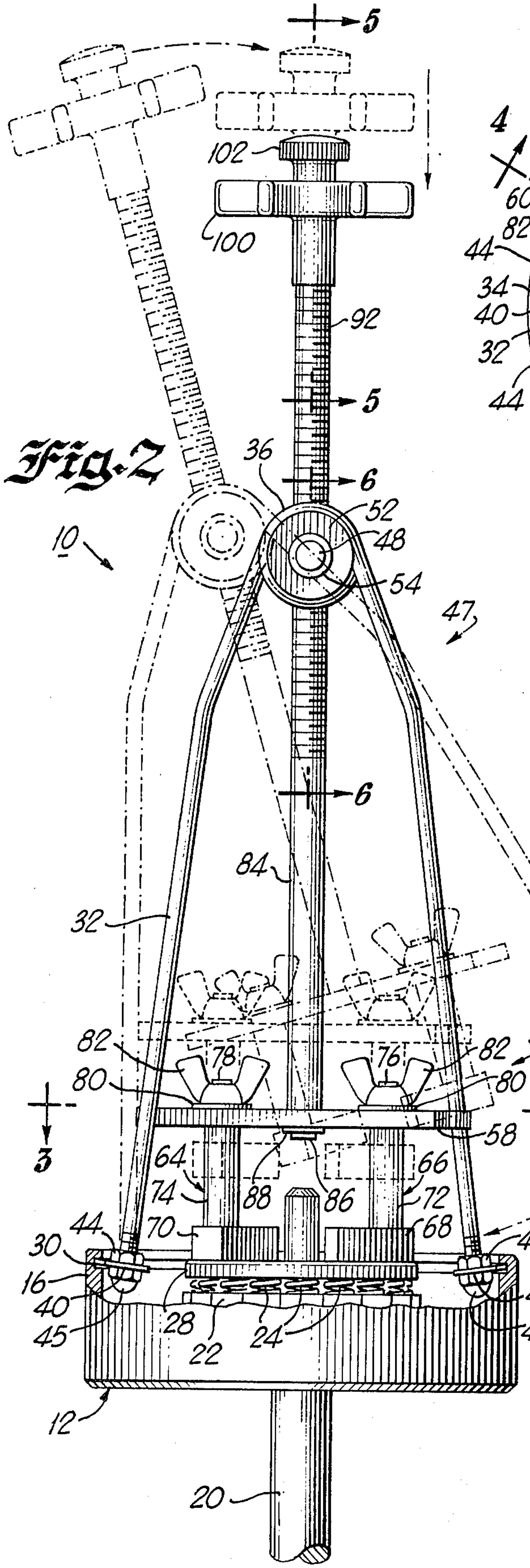
FIG. 2 is an elevational view of the tool of the present invention mounted within a clutch piston assembly.

More specifically and with reference to FIGS. 2 and 4, mounted within all automatic transmissions (not shown) is a clutch spring assembly generally designated as 12 in the drawings. Typically, the disassembly of the clutch piston assembly 12 has been complicated since to disassemble the piston assembly 12, a retainer ring 14 must be removed. The retainer ring 14 is mounted within the clutch piston housing or drum 16. The drum 16 includes a hub 17 having central aperture 18 into which is press fitted an input shaft 20 that is connected to the automatic transmission.

Also mounted within the drum 16 is the clutch piston 22. The piston 22 is maintained within the drum 16 by one or more springs 24. The springs 24 can be mounted within bores 26 fabricated in piston 22 and held in a compressed position by a spring seat 28. The spring seat 28 is held within the drum 16 by the retainer ring 14 positioned within slot 29. Accordingly, to remove piston 22 and, thus, disassemble the clutch piston assembly 12, the retainer ring 14 must be removed.

The removal of the retaining ring 14 is accomplished with the clutch spring compressor tool 10. The tool 10 operates by interacting with a slot 30 fabricated on the inner peripheral surface of the housing or drum 16. Since slot 30 is fabricated on the inner peripheral surface of the housing or drum 16. Since slot 30 is fabricated in all vehicle automatic transmissions, the tool of the present invention is useful in repairing all vehicle automatic transmissions. The slot 30 is always employed to secure and maintain a retaining ring (not shown) that retains the face plates and forward clutch pressure plates (not shows) found in all clutch piston assemblies 10. This retaining ring (not shown) mounted within the groove 30 is easily pryed out of slot 30 with any suitable tool, such as a screwdriver.

Figure 8:
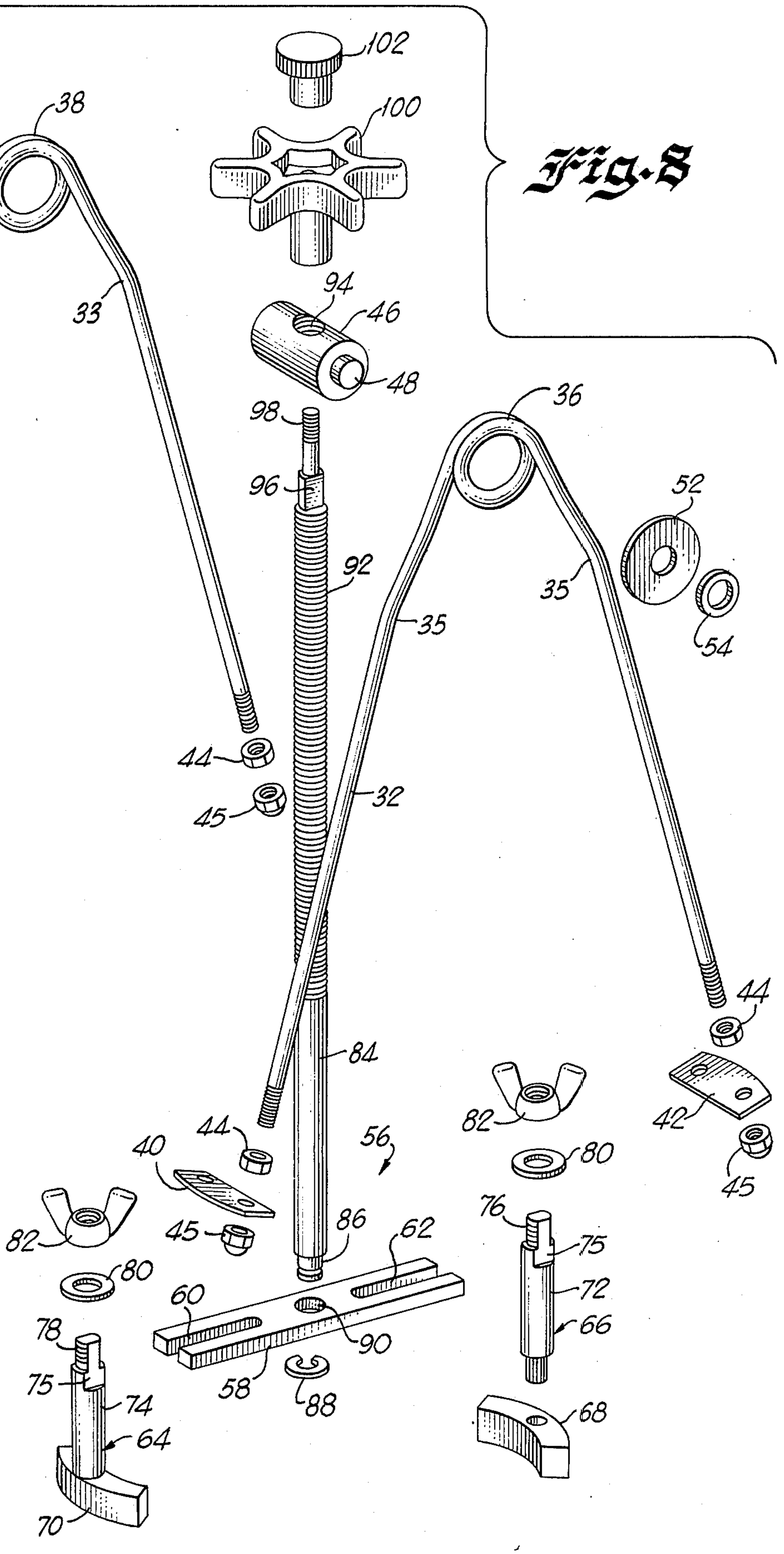
FIG. 8 is an exploded, isometric view of the tool of the present invention.
Figure 7:
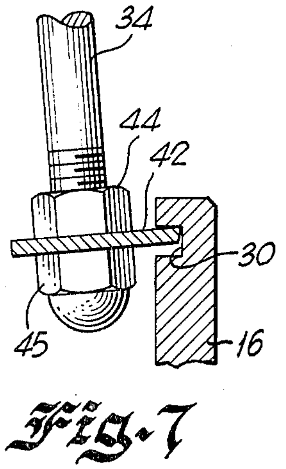
FIG. 7 is a view taken along line 7—7 of FIG. 3.

To interact with slot 30 the tool 10 includes resilient spring arms 32 and 34 (FIG. 8). The spring arms 32 and 34 are each formed with a loop 36 and 38, respectively. These spring arms provide an outward biasing force to secure the tool within the slot 30 of the housing or drum 16 while the spring seat 28 is being compressed. The arms 32 and 34 each include a slight bend 33 and 35, respectively, that serves to direct the biasing force of the arms 32 and 34 in the outward direction in order to secure the tool 10 within the slot 30. Secured to the ends of the resilient arms 32 and 34 are plates 40 and 42. The slight upward and outward angle of the plates 40 and 42 also serves to secure the tool within the slot 30. These plates 40 and 42 are secured to the ends of the resilient arms 32 and 34 by nuts 44 and 45. These nuts 44 and 45 easily can be adjusted to assure initial fit of the plates 40 and 42 into the slot 30. After initial adjustment of the plates 40 and 42 will need no further adjustment unless the plates become appreciably worn through use. The plates 40 and 42 are of a sufficiently thin dimension to allow them to be positioned within the slot or groove 30 (FIG. 7).

The plates 40 and 42 are wedge shaped to include a knife edge at the slot inserting edge so that the plates 40 and 42 easily can cut through grease or other foreign matter within slot 30 to snap into the slot 30 and firmly bite into the slot to secure the tool 10 in position. This self-cleaning action of the plates 40 and 42 assures complete penetration of the compressor tool 10 into slot 30 so that the tool 10 will grip into a clean metal surface to avoid slipping out of position while the spring seat 28 is being compressed.

The resilient arms 32 and 32 and the plates 40 and 42 are secured together by a coupling member 46 to form a resilient arm assembly generally designated as 47. The coupling member 46 is of a cylindrical configuration having integral, reduced cylindrical extensions 48 and 50. To assemble the resilient arm assembly 46, the resilient arms 32 and 34 are mounted on opposite ends of the coupling member 46 by passing the reduced cylindrical extensions 48 and 50 through the loops 36 and 38, respectively. To prevent the resilient arms 32 and 34 from sliding off of the coupling member 46, washers 52 and snap rings 54 are also mounted on the extensions 48 and 50 of the coupling member 46.

The resilient arms 32 and 34 in combination with the plates 40 and 42 are employed to secure the tool 10 to the clutch piston assembly 12 and, specifically, the drum 16 by placing one of the plates, for example plate 40, in the groove 30 in the drum 16. By compressing the resilient arms 32 and 34, the second plate, in this example 42, can also be positioned for insertion within the groove 30. The outward forces exerted by the resilient arms 32 and 34 forcing the plates 40 and 42 into the slot 30 firmly secure the tool 10 relative to the drum 16 and thus, the clutch piston assembly 12.

To remove the retainer ring 14 the springs 24 must be compressed thereby moving the spring seat 28 away from the ring 14 to allow the ring 14 to be removed by a tool. To compress the springs 24 and move the spring seat 28 away from retainer ring 14, tool 10 includes a platform assembly generally designated as 56. The platform assembly 56 is adjustable to the dimensions of the spring seat 28 which may vary depending on the model of the transmission. More specifically, the platform assembly 56 includes an elongated bar 58 having elongated slots 60 and 62 fabricated therein. Mounted within the slots 60 and 62 and on the plate 58 are engagement members generally designated as 64 and 66. The engagement members 64 and 66 include arcuate members 68 and 70 that are press fitted on shafts 72 and 74. Shafts 72 and 74 have threaded ends 76 and 78, respectively, onto which may be secured washers 80 and wing nuts 82. In this manner, wing nuts 82 may be loosened allowing the movement of the mounting assemblies 64 and 66 within the slots 60 and 62, thus varying the spacing of the plates 68 and 70 to accomodate the different sizes of spring seats 28 found in the various transmissions. Flat portions 75 on shafts 72 and 74 are provided to prevent the shafts 72 and 74 from rotating so that the arcuate members 68 and 70 are maintained in alignment over the spring seat 28.

The plates 68 and 70 are positioned on the spring seat 28 and transmit compressive forces to the spring seat 28 in order to compress the springs 24, thus allowing the removal of the ring 14. The compressive force that is imparted to the platform assembly 56 is generated through a stem 84. The stem 84 has integrally fabricated on the lower end thereof a reduced portion 86 that allows the mounting of a snap ring 88 on the reduced portion 86 once it is passed through a central aperture 90 in bar 58, thus locking or firmly securing the stem 84 to the plate 58.

The upper portion of the stem 84 includes threads 92. This threaded portion 92 is threaded through a central aperture 94 fabricated in the coupling member 46. The upper end of the stem 84 includes a multisided portion 96 and a threaded integral extension 98. A handle 100 is mounted onto the upper end of the stem 84 and includes an internal configuration that mates with the multisided portion 96 of the stem 84. A quick knob 102 is then placed on top of the handle 100 and threaded upon the threaded portion 98 of the stem 84 thereby locking the handle 100 relative to the stem 84.

In the assembled configuration of the tool 10 (FIG. 1), the stem 84 may be rotated by the handle 100 threading the portion 92 of the stem 84 through the aperture 94 of the coupling member 46. In this manner, the position of the platform assembly 56 can be varied relative to the coupling member 46 and thus the plates 40 and 42.

Accordingly, in order to remove the retainer ring 14 from the clutch piston assembly 12, the tool 10 is first oriented relative to the drum 16 such that one of the plates, for example 40, is positioned within the groove 30 (dashed lines, FIG. 2). The resilient legs 32 and 34 are then compressed (FIG. 2) to allow the second plate, in this example plate 42, to be also snapped into position in the groove 30 on a side of the drum 16 opposite that of plate 40 (FIG. 2). At the same time, the platform assembly 56 and, specifically, members 68 and 70 are adjusted within the slots 60 and 62 and to match the size of the spring seat 28 such that as the tool 10 is mounted relative to the clutch piston assembly 12, the members 68 and 70 are positioned directly upon the spring seat 28. Once in this position, the quick knob 102 may be turned so as to thread the portion 92 of the stem 84 through the aperture 94 of the coupling member 46 until the assembly 56 engages the seat 28. This action allows rapid positioning of the assembly 56 onto the seat 28. Moreover, since the stem 84, prior to the engagement of the assembly 56 with the seat 28, is free to swing in a pendulum fashion relative to the coupling member 46, accurate self aligning of the assembly 56 on the seat 28 is possible. More specifically, as the knob 102 is rotated, moving the assembly 56 onto the seat 28, one of the plates may engage the seat 28 prior to the other plate. If this occurs, as the knob 102 is further rotated, the stem 84 will swing slightly, moving the other plate onto the seat 28 to align assembly 56.

Once assembly 56 completely engages seat 28, handle 100 can be rotated resulting in a tension on the resilient legs 32 and 34 and since they cannot move out of the groove 30 due to the outwardly directed forces of the compressed arms 32 and 34, a compressive force is imparted through the stem 84 to the platform assembly 56 resulting in a compression of the springs 24. In this manner, the spring seat 28 is moved from the retainer ring 14.

Once this is accomplished, a tool well known in the art commonly known as a snap ring pliers may be employed to remove the retainer ring 14. After the ring 14 has been removed, the handle 100 may be rotated in the reverse direction releasing the tension on the platform assembly 56 and reducing the compression on the spring 24 until arcuate members 68 and 70 are no longer in contact with spring seat 28. The resilient legs 32 and 34 may then be compressed removing the plates 40 and 42 out of the groove 30. The clutch piston assembly may then be disassembled and repaired. Once the repair has been completed, the above operation can be reversed, replacing the retainer ring 14 and reassembling the clutch piston assembly 12.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method of removing a retaining ring from an automatic transmission, said automatic transmission having a housing including an annular slot, and a spring seat, comprising connecting a pair of elongated arms to said slot to hold said arms in position relative to said slot;

outwardly biasing said elongated arms to hold said arms within position relative to said slot;

moving a spring seat engaging member relative to said arms to contact said spring seat and thereby compressing said spring seat with said spring seat engaging member;

removing said retainer ring.

2. An apparatus for disassembling a clutch piston assembly in an automobile automatic transmission, said assembly including a housing having positioned therein a piston, said piston held in said housing by a plurality of springs and a spring seat, said spring seat maintained in said housing by a retaining ring, said housing also including at least one slot fabricated on the peripheral surface of said housing, said apparatus comprising an elongated stem, a pair of resilient arms mounted on said stem, said arms including means for engaging said slot, and said stem including means for engaging said spring seat, said stem further including means for applying a compressive force to said spring seat when said apparatus is in operative position.

3. The apparatus as defined in claim 2, wherein said slot engaging means on said arms comprises a plate secured to each arm of a configuration to engage said slot.

4. A tool for removing a retaining ring retaining a piston in a clutch piston assembly for an automatic transmission, said assembly including a drum having mounted therein said piston maintained in said drum by a plurality of springs, said springs maintained in said drum by a spring seat and said seat retained in said drum by a retaining ring, said drum further including at least one groove fabricated on the periphery thereof, said tool comprising a resilient arm assembly including means for releasably securing said resilient arm assembly in said groove for securing said tool relative to said clutch piston assembly, and a stem secured to said arm assembly and moveable relative to said arm assembly to apply a compressive force on said springs and said spring seat, said stem having secured thereto a platform assembly for engaging said spring seat and transmitting said compressive force thereto.

5. The tool set forth in claim 4, said arm assembly comprising two spring seat engaging members coupled by a coupling member, said coupling member having a threaded aperture through which said stem extends, said arm assembly further comprising at least one plate member secured to said arm assembly, said plate member being of a dimension to allow insertion into said groove.

6. The tool set forth in claim 5, wherein said stem includes a threaded portion extending through said aperture in said coupling member, wherein said platform assembly includes at least one engagement member for engaging said spring seat, and wherein the lateral position of said engagement member relative to said stem is variable.

7. An apparatus for removing the retainer ring in a clutch piston assembly, said piston assembly including a housing having means defining an annular slot on the inner periphery thereof, and a spring seat, biased by one or more springs against said retainer ring said apparatus comprising an elongated stem;

a pair of elongated arms connected to said stem, said elongated arms including means for biasing said arms outwardly from said stem when said apparatus is in operative position;

means connected to said arms for insertion into said housing slot for securing said apparatus within said housing slot to prevent any substantial movement of said arms during a compressive operation of the apparatus, when said apparatus is secured within said housing;

means connected to said stem for engaging and compressing said spring seat;

means for compressing said engaging means against said spring seat when said apparatus is secured within said housing.

8. The apparatus as defined in claim 7, said means for engaging said spring seat comprising at least one annular member secured to said stem wherein the position of said annular member relative to said stem is variable.

9. The apparatus as defined in claim 7 wherein said arms are resilient to provide an outwardly directed biasing force thereto when said apparatus is in operative position.

10. The apparatus as defined in claim 7 wherein said means for securing said apparatus within said housing slot includes a plate member attached to each arm of a sufficient dimension to be held within said housing slot.

* * * * *